US010395345B2

(12) United States Patent
Davis

(10) Patent No.: US 10,395,345 B2
(45) Date of Patent: Aug. 27, 2019

(54) APPLYING DIFFERENT MOTION BLUR PARAMETERS TO SPATIAL FRAME REGIONS WITHIN A SEQUENCE OF IMAGE FRAMES

(71) Applicant: RealD Inc., Beverly Hills, CA (US)

(72) Inventor: Anthony Davis, Albuquerque, NM (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 15/934,394

(22) Filed: Mar. 23, 2018

(65) Prior Publication Data

US 2018/0286019 A1 Oct. 4, 2018

Related U.S. Application Data

(60) Provisional application No. 62/476,279, filed on Mar. 24, 2017.

(51) Int. Cl.
*G06T 5/00* (2006.01)
*G06T 5/50* (2006.01)
*H04N 7/01* (2006.01)

(52) U.S. Cl.
CPC ................ *G06T 5/002* (2013.01); *G06T 5/50* (2013.01); *H04N 7/0127* (2013.01); *H04N 7/0137* (2013.01); *G06T 2207/10016* (2013.01); *G06T 2207/20212* (2013.01); *G06T 2207/20221* (2013.01)

(58) Field of Classification Search
CPC . G06T 2207/10016; G06T 2207/20212; G06T 5/002; G06T 5/50; H04N 7/0127; H04N 7/0137
See application file for complete search history.

(56) References Cited

U.S. PATENT DOCUMENTS 6,891,570 B2 * 5/2005 Tantalo ................ H04N 5/2351 345/474
7,652,721 B1 1/2010 Holt et al.
8,610,818 B2 * 12/2013 Furlan .................... H04N 19/51 348/180
2006/0017837 A1 1/2006 Sorek et al.
(Continued)

OTHER PUBLICATIONS

International Search Report and Written Opinion dated Jul. 4, 2018 for International Patent Application No. PCT/US2018/024072.

*Primary Examiner* — Amy R Hsu
(74) *Attorney, Agent, or Firm* — Penny L. Lowry; Neil G. J. Mothew

(57) ABSTRACT

First and second spatial frame regions are identified in a sequence of motion picture image frames captured at a high frame rate. Different motion blur parameters are determined for each of the first and second spatial frame regions. First and second intermediate frame sequences having frame rates less than the capture frame rate are generated from the original frame sequence. The first motion blur parameter is applied to the first intermediate frame sequence and the second motion blur parameter is applied to the second intermediate frame sequence. The first and second spatial frame regions in the corresponding first and second intermediate frame sequences are composited to produce an output frame sequence having different motion blur in different regions of the scene.

17 Claims, 4 Drawing Sheets

(56) References Cited

U.S. PATENT DOCUMENTS

| | | | | |
|---|---|---|---|---|
| 2011/0058023 | A1* | 3/2011 | Boles | G01B 11/2513<br>348/46 |
| 2013/0182177 | A1* | 7/2013 | Furlan | H04N 19/51<br>348/362 |
| 2016/0350922 | A1* | 12/2016 | Tofolo | G06T 7/20 |
| 2017/0034429 | A1 | 2/2017 | Huysegems et al. | |
| 2018/0000382 | A1* | 1/2018 | Chatterjee | A61B 5/113 |

* cited by examiner

APPLYING DIFFERENT MOTION BLUR PARAMETERS TO SPATIAL FRAME REGIONS WITHIN A SEQUENCE OF IMAGE FRAMES

TECHNICAL FIELD

This disclosure relates generally to motion picture image frame processing, and more particularly to selectively applying different parameters of motion blur to specified spatial areas within a sequence of motion picture frames.

BACKGROUND

In motion picture imagery, when action is captured, any movement of the subject being captured introduces motion blur within each frame. The amount and character of this motion blur is traditionally controlled by the shutter of the motion picture camera. A shutter which is open for a longer period of time will allow more motion blur per frame, and a shutter which is open for a shorter period of time will allow less motion blur per frame.

BRIEF SUMMARY

Disclosed herein are embodiments of methods, systems, and computer program products for processing a sequence of motion picture frames. The sequence of image frames may be captured at a capture frame rate. The sequence of image frames may be received, and a spatial frame region (a power window) may be identified for the image frames in the sequence of image frames. The spatial frame region may be a subset of image information in the image frames. The capture frame rate of the spatial frame region may then be reduced, and a motion blur parameter may be applied to the spatial frame region. In some embodiments, a second spatial frame region (a second power window) may be identified for the image frames in the sequence of image frames. The second spatial frame region may be a different subset of image information in the image frames. The capture frame rate of the second spatial frame region may then be reduced, and a different motion blur parameter may be applied to the spatial frame region.

Also disclosed herein are other embodiments of methods, systems, and computer program products for processing a sequence of motion picture frames. The sequence of image frames may be captured at a capture frame rate. The sequence of image frames may be received, and a spatial frame region (a power window) may be identified for the image frames in the sequence of image frames. The spatial frame region may be a subset of image information in the image frames. A plurality of intermediate frame sequences may be generated. In some embodiments, the plurality of intermediate frame sequences may be generated by reducing the frame rate of the sequence of image frames. A motion blur parameter may be applied to a first intermediate frame sequence. In some embodiments, the motion blur parameter may be applied to the identified spatial frame region. After applying the motion blur parameter, the first spatial frame region of the first intermediate frame sequence may be composited with a different intermediate frame sequence.

In some embodiments, a second spatial frame region (a second power window) may be identified for the image frames in the sequence of image frames. The second spatial frame region may be a different subset of image information in the image frames. In such embodiments, the first spatial frame region of the first intermediate frame sequence may be composited with the second spatial frame region of a second intermediate frame sequence. In some embodiments, a second motion blur parameter may be applied to the second intermediate frame sequence before the compositing.

In some embodiments, a third spatial frame region (a third power window) may be identified for the image frames in the sequence of image frames. The third spatial frame region may be a different subset of image information in the image frames than the first and/or the second spatial frame regions. In such embodiments, the first spatial frame region of the first intermediate frame sequence may be composited with the second spatial frame region of a second intermediate frame sequence and with the third spatial frame region of a third intermediate frame sequence. In some embodiments, a third motion blur parameter may be applied to the third intermediate frame sequence before the compositing.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
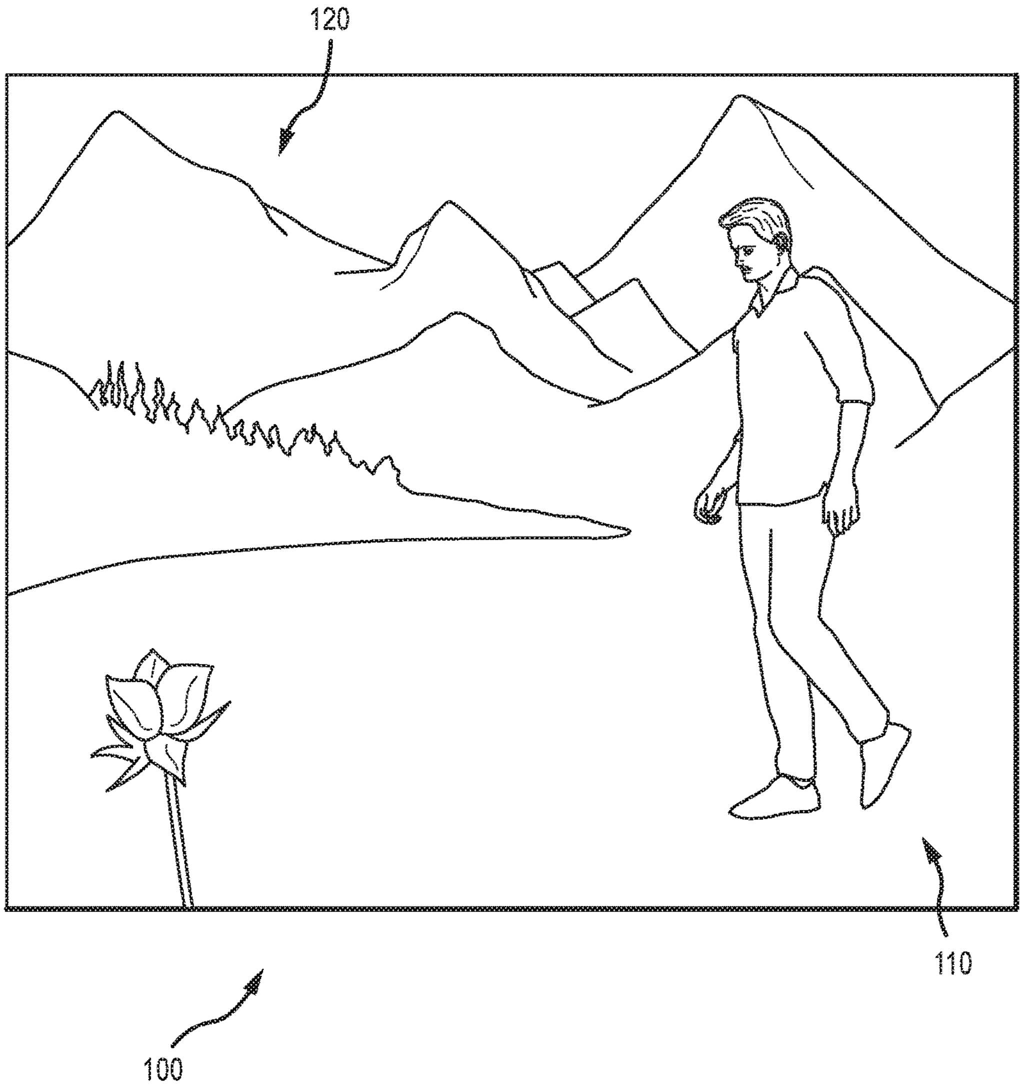
FIG. 1 depicts an image frame showing a scene having at least one element where a small amount of motion blur per-frame is desired and other elements where a large amount of motion blur per-frame is desired.

A sequence of motion picture image frames captured at a high capture frame rate (i.e., high-frame-rate input footage) can be used to create lower frame rate output motion picture image frame sequences, and during this process the specific frame blending of high-frame-rate input footage may be chosen to synthesize a new shutter waveform in the output image frames, as taught in commonly-owned U.S. Patent Publication No. 2017-0094221 entitled "Method of temporal resampling and apparent motion speed change for motion picture data," herein incorporated by reference in its entirety. This synthesis of the new shutter waveform creates the specific motion blur that is applied to the output footage, and the selection of the shutter waveform motion blur parameters will alter the look of motion by changing the resulting motion blur within each output image frame.

During this frame down-sampling, a wide variety of shutter waveforms can be produced, which in turn may vary the character of the motion blur per-frame and the aesthetic of the output footage.

It is current practice to apply the choice of a particular setting for motion blur uniformly over the entire spatial range of each output frame. However, a motion blur parameter which is aesthetically pleasing for one element in the frames of an image sequence may be ill-suited for other elements within the scene. For example, if an actor is performing in the foreground of a scene, and simultaneously the background is moving rapidly, it may be desirable to have a large amount of motion blur in the background to reduce its apparent contrast with respect to the foreground actor. At the same time, it may be desirable to keep the motion blur on the actor small to preserve facial or acting detail. In such practice, a compromise between these two desired motion blur settings would have to be chosen, providing a less than optimal motion blur result for both the background and the foreground.

As disclosed herein, results may be improved by applying different motion blur settings for different elements in the frame. To achieve this, the same footage can be rendered from a high frame rate to produce multiple intermediate versions of the footage at the desired display frame rate with any number of different motion blur settings. Each intermediate version can have a different motion blur appearance which produces the desired aesthetic for motion for different elements within the scene. These intermediate output frame sequences may be processed so that there is little to no temporal or spatial offsets between the corresponding frames of each sequence. It is then possible to composite between the various standard-frame-rate intermediate sequences to produce the final output. In this compositing, a spatial region of the image frame, i.e, a "power window" or matte, may be defined and potentially animated during the sequence, and may define which portions of the intermediate frames are used in each spatial region. The power window is a subset of image information in the image frame.

For example, FIG. 1 depicts an image frame 100 showing a scene having at least one element where a small amount of motion blur per-frame is desired and other elements where a large amount of motion blur per-frame is desired. A small amount of motion blur per-frame is desired for the actor 110 in the foreground, while a large amount of motion blur per-frame is desired for the background 120 moving behind the actor 110. Image frame 100 represents one frame of a sequence of image frames capturing the scene at a high frame rate.

Intermediate versions of the captured sequence of image frames may then be produced at a lower frame rate. For the example shown in FIG. 1, two intermediate frame-rate versions may be created: one with very little motion blur and one with a large amount of motion blur. To create the two versions, a motion blur parameter that produces very little motion blur may be applied to one of the intermediate frame sequences, while a different motion blur parameter that produces a large amount of motion blur may be applied to the other intermediate frame sequence.

Figure 2:
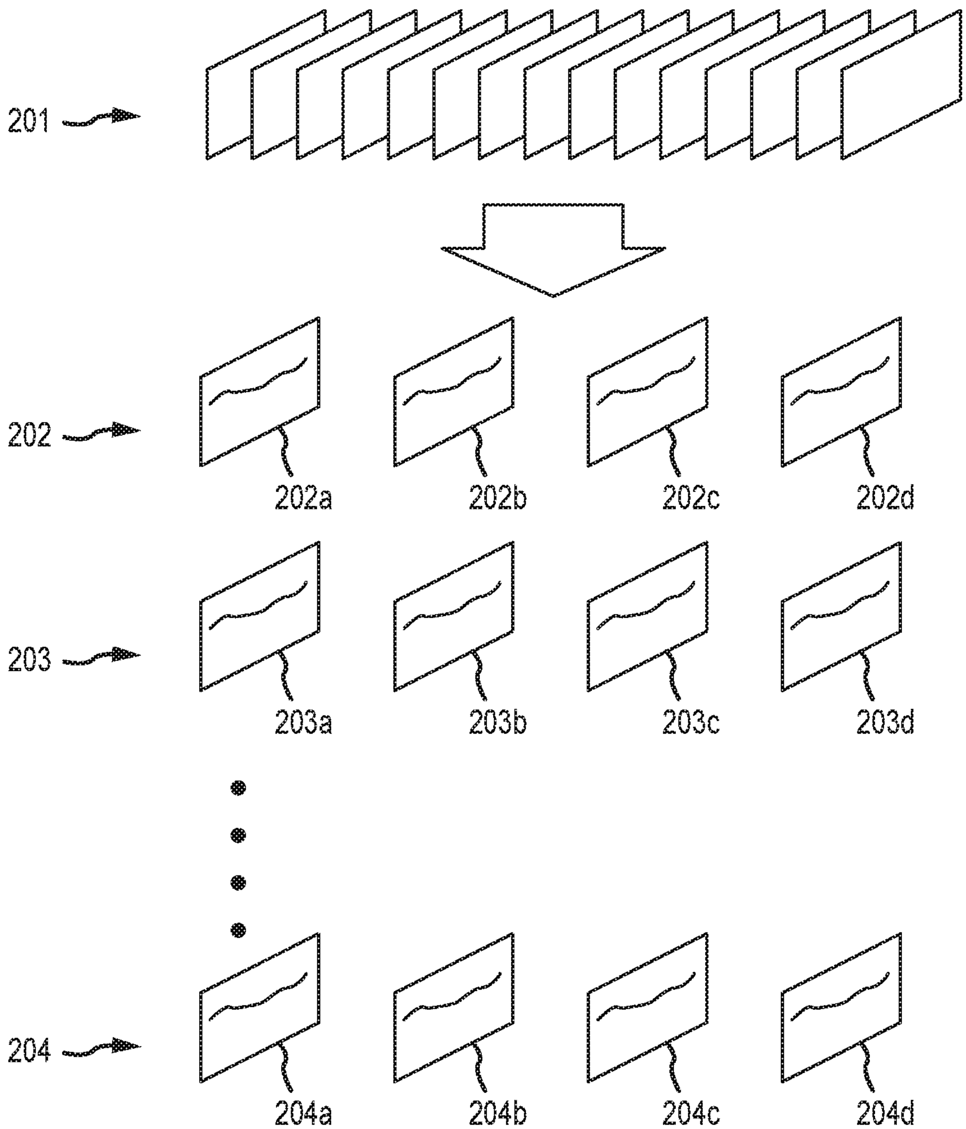
FIG. 2 depicts a sequence of motion picture image frames capturing a scene at a high frame rate, and multiple intermediate sequences depicting the scene that have an output frame rate lower than the capture frame rate.

Any number of such intermediate frame sequences may be created from a single sequence capturing a scene at a high frame rate, and different motion blur parameters may be applied to each individual intermediate frame sequence to produce intermediate frame sequences having differing amounts of motion blur for the captured scene. FIG. 2 depicts a sequence 201 of motion picture image frames captured at a capture frame rate. Intermediate frame sequences 202, 203 and so on through intermediate frame sequence 204 may then be generated from sequence 201, with the intermediate frame sequences having a desired output frame rate less than the original capture frame rate. Each intermediate frame sequence consists of individual image frames; for example, intermediate frame sequence 202 consists of image frames 202*a*, 202*b*, 202*c*, and 202*d*. Each intermediate frame sequence may then be modified with various motion blur parameters to produce a different amount of motion blur for the scene in each of the intermediate sequences. For example, intermediate sequence 202 may have a first amount of motion blur, intermediate sequence 203 may have a larger amount of motion blur than intermediate sequence 202, and intermediate sequence 204 may have a larger amount of motion blur than intermediate sequence 203. The intermediate sequences may be temporally and spatially aligned.

Figure 3:
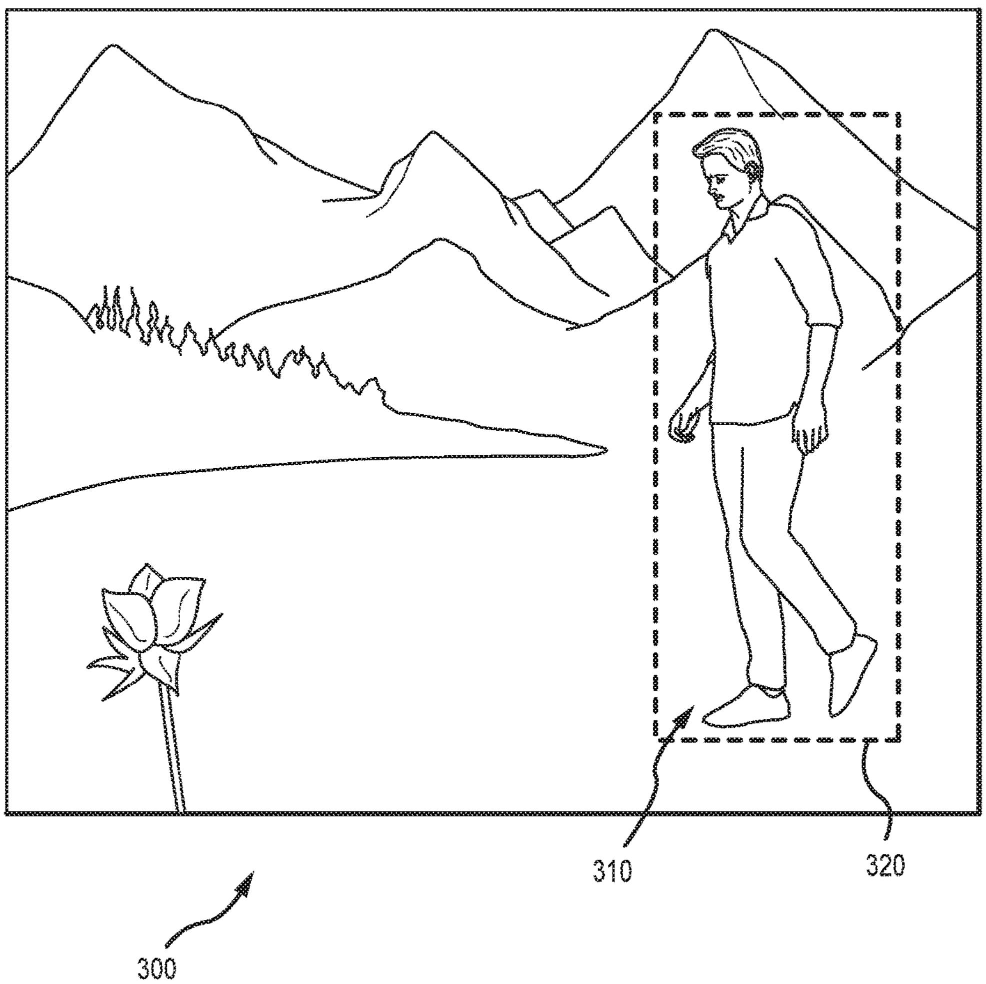
FIG. 3 depicts an image frame showing a scene having a power window encompassing an element where a small amount of motion blur per-frame is desired.
Figure 4:
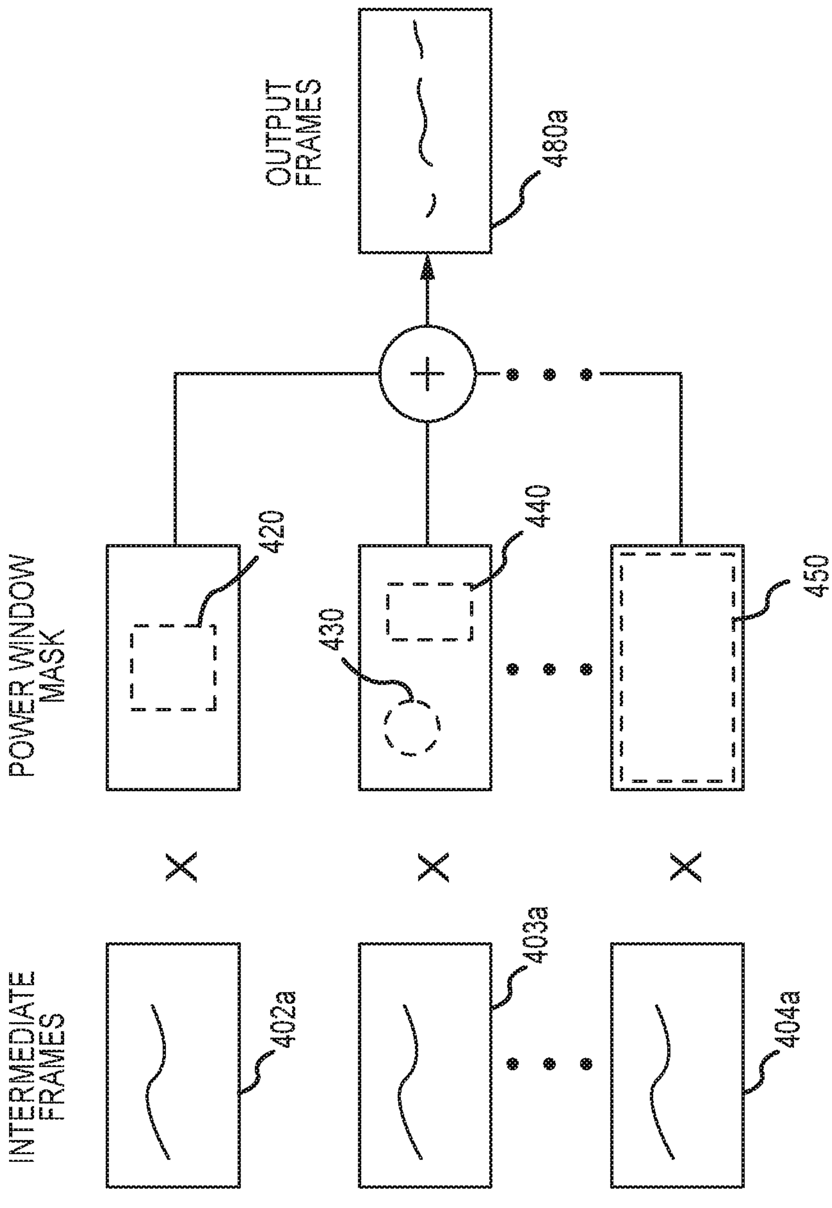
FIG. 4 depicts an example power-window compositing process.

FIG. 3 depicts an image frame 300 showing a scene having an actor 310 where a small amount of motion blur per-frame is desired and other background elements where a larger amount of motion blur per-frame is desired, similar to FIG. 1. A power window 320 encompasses the target element 310 in the captured scene where a small amount of motion blur is desired. Power windows are a form of digital matte which are used to composite pixels from one frame of footage into another frame of footage. The shape and edge softness of power windows may be varied, and the geometry and position over time may be animated to track features in a scene. Image frame 300 represents one frame of a sequence of image frames capturing the scene at a high frame rate.

Power windows are used to permit or restrict, or to partially permit or partially restrict (e.g., softening, blending and the like) particular pixels in the frames of one intermediate image frame sequence from overlaying the pixels in each corresponding frame in another intermediate image frame sequence. By using power windows, different elements in the scene may have different motion blur profiles. In some embodiments, the filmmaker or digital image processor may also manually or automatically alter the position and size of each power window to track moving elements in the image frame.

An example power-window compositing process is shown in Error! Reference source not found. Each image frame of an intermediate frame sequence may be multiplied by the user-defined or machine-defined power window mask, and the corresponding frame of every other intermediate sequence may be multiplied by its corresponding power window mask, and all the resulting product images may be summed to produce the output frame sequence. For example, a scene may be captured at a high frame rate to produce a sequence of image frames. Because differing amounts of motion blur may be desired for various elements in the scene, power windows 420, 430, 440, and 450 may be identified to specify the regions of the image frames where the various elements are located. In this example, power window 420 may encompass a part of the scene containing an actor in the foreground where a small amount of motion blur is desired, power window 450 may encompass the background moving behind the actor where a larger amount of motion blur is desired, and power windows 430 and 440 may encompass other elements in the scene where an amount of motion blur between the foreground and the background is desired. Other power windows may be identified as well for other spatial frame regions in the scene.

A number of intermediate frame sequences 402, 403, and so on through intermediate frame sequence 404 may then be generated from the original sequence. Depending on the desired output frame rate, each intermediate frame sequence consists of individual image frames a, b, c, d, and so on. A first motion blur parameter appropriate for power window 420 may then be applied to intermediate frame sequence 402, a different motion blur parameter that produces a larger amount of motion blur appropriate for power windows 430 and 440 may then be applied to intermediate frame sequence 403, and another different motion blur parameter that produces a still larger amount of motion blur appropriate for background power window 450 may then be applied to intermediate frame sequence 404.

The first image frame 402*a* in intermediate frame sequence 402 is then multiplied by power window mask

420, the first image frame 403*a* in intermediate frame sequence 403 is multiplied by power window masks 430 and 440, and the first image frame 404*a* in intermediate frame sequence 404 is multiplied by power window mask 450. The resulting product images are then summed to produce the first image frame 480*a* in output frame sequence 480. The process is repeated for the second image frame in each intermediate frame sequence to produce the second image frame in the output frame sequence. The process is then repeated for each successive image frame in the intermediate frame sequences to produce all image frames in the output frame sequence. The scene in the completed output motion picture image frame sequence then has optimal motion blur for the various elements in the scene.

Various embodiments of the disclosed invention may be systems, methods, and/or a computer program product. A computer program product may include a computer-readable storage medium having computer-readable program instructions thereon for causing one or more processors to carry out aspects of the embodiment. A computer-readable storage medium may be a tangible device that can retain and store instructions for use by an instruction execution device. Computer-readable program instructions may be assembler instructions, machine instructions, microcode, firmware, object code, source code written in one or more programming languages, or any other program instructions readable by a computer. The computer-readable instructions may execute on one or more processors of a user computer, a remote computer, or a combination thereof. A remote computer may be connected to a user computer through a network. The computer-readable instructions may execute on electronic circuitry such as programmable logic circuitry, field-programmable gate arrays, or programmable logic arrays.

As may be used herein, the terms "substantially" and "approximately" provide an industry-accepted tolerance for its corresponding term and/or relativity between items. Such an industry-accepted tolerance ranges from zero to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method of processing a sequence of image frames captured at a capture frame rate, the method comprising:
- receiving the sequence of image frames captured at the capture frame rate;
- identifying a first spatial frame region for the image frames in the sequence of image frames, the first spatial frame region being a first subset of image information in the image frames;
- reducing the frame rate of the first spatial frame region in the sequence of image frames;
- applying a first motion blur parameter to the first spatial frame region in the sequence of image frames;
- identifying a second spatial frame region for the image frames in the sequence of image frames, the second spatial frame region being a second subset of image information in the image frames, the second subset different from the first subset;
- reducing the frame rate of the second spatial frame region in the sequence of image frames; and
- applying a second motion blur parameter to the second spatial frame region in the sequence of image frames, the second motion blur parameter different from the first motion blur parameter.

2. A system for processing a sequence of image frames captured at a capture frame rate, the system comprising one or more processors configured to perform the method of claim 1.

3. A computer program product for processing a sequence of image frames captured at a capture frame rate, the computer program product comprising a non-transitory computer-readable storage medium having computer-readable program instructions thereon for causing at least one processor to perform the method of claim 1.

4. A method of processing a sequence of image frames, the method comprising:
- receiving the sequence of image frames captured at a capture frame rate;
- identifying a first spatial frame region for the image frames in the sequence of image frames, the first spatial frame region being a first subset of image information in the image frames;
- generating a plurality of intermediate frame sequences from the sequence of image frames;
- applying a first motion blur parameter to a first intermediate frame sequence; and
- after applying the first motion blur parameter to the first intermediate frame sequence, compositing the first spatial frame region of the first intermediate frame sequence with a different intermediate frame sequence.

5. The method of claim 4, wherein generating the first intermediate frame sequence comprises reducing the frame rate of the sequence of image frames.

6. The method of claim 4, wherein the applying the first motion blur parameter to the first intermediate frame sequence comprises applying the first motion blur parameter to the first spatial frame region of the first intermediate frame sequence.

7. The method of claim 4, further comprising:

identifying a second spatial frame region for the image frames in the sequence of image frames, the second spatial frame region being a second subset of image information in the image frames, the second subset different from the first subset, wherein the different intermediate frame sequence is the second spatial frame region of a second intermediate frame sequence.

8. The method of claim 7, further comprising:

before the compositing, applying a second motion blur parameter to the second intermediate frame sequence.

9. The method of claim 8, wherein the applying the second motion blur parameter to the second intermediate frame sequence comprises applying the second motion blur parameter to the second spatial frame region of the second intermediate frame sequence.

10. The method of claim 7, further comprising:

identifying a third spatial frame region for the image frames in the sequence of image frames, the third spatial frame region being a third subset of image information in the image frames, the third subset different from the first subset, and the third subset different from the second subset; and further compositing the third spatial frame region of a third intermediate frame sequence with the first spatial frame region of the first intermediate frame sequence and the second spatial frame region of the second intermediate frame sequence.

11. The method of claim 7, wherein the generating the second intermediate frame sequence comprises reducing the frame rate of the sequence of image frames.

12. The method of claim 7, wherein the first intermediate frame sequence has a first frame rate and first image content, wherein the second intermediate frame sequence has a second frame rate and second image content, wherein the first frame rate is the same as the second frame rate, and wherein the first image content and the second image content are substantially identical.

13. A system for processing a sequence of image frames, the system comprising one or more processors configured to perform the method of claim 4.

14. A computer program product for processing a sequence of image frames, the computer program product comprising a non-transitory computer-readable storage medium having computer-readable program instructions thereon for causing at least one processor to perform the method of claim 4.

15. A method of processing a sequence of image frames captured at a capture frame rate, the method comprising:

receiving the sequence of image frames;

identifying a first spatial frame region for the image frames in the sequence of image frames, the first spatial frame region being a first subset of image information in the image frames;

determining a first motion blur parameter for the first spatial frame region;

identifying a second spatial frame region for the image frames in the sequence of image frames, the second spatial frame region being a second subset of image information in the image frames different from the first subset;

determining a second motion blur parameter for the second spatial frame region different from the first motion blur parameter;

generating a first intermediate frame sequence from the sequence of image frames, the first intermediate frame sequence having an output frame rate less than the capture frame rate;

applying the first motion blur parameter to the first intermediate frame sequence;

generating a second intermediate frame sequence from the sequence of image frames, the second intermediate frame sequence having the output frame rate;

applying the second motion blur parameter to the second intermediate frame sequence; and for each image frame in the first intermediate frame sequence, compositing the first spatial frame region of the image frame in the first intermediate frame sequence with the second spatial frame region of the corresponding image frame in the second intermediate frame sequence.

16. A system for processing a sequence of image frames, the system comprising one or more processors configured to perform the method of claim 15.

17. A computer program product for processing a sequence of image frames, the computer program product comprising a non-transitory computer-readable storage medium having computer-readable program instructions thereon for causing at least one processor to perform the method of claim 15.

* * * * *